US008535822B2

(12) United States Patent
Cha et al.

(10) Patent No.: US 8,535,822 B2
(45) Date of Patent: Sep. 17, 2013

(54) ELECTRODE ASSEMBLY AND SECONDARY BATTERY HAVING THE SAME

(75) Inventors: Seungyeob Cha, Yongin-si (KR); Sangho Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 637 days.

(21) Appl. No.: 12/456,624

(22) Filed: Jun. 19, 2009

(65) Prior Publication Data

US 2009/0317701 A1 Dec. 24, 2009

(30) Foreign Application Priority Data

Jun. 23, 2008 (KR) .................. 10-2008-0058965

(51) Int. Cl.
*H01M 4/00* (2006.01)

(52) U.S. Cl.
USPC ............................................ 429/94; 429/135

(58) Field of Classification Search
USPC ....................................................... 429/135
See application file for complete search history.

(56) References Cited

U.S. PATENT DOCUMENTS

| | | | |
|---|---|---|---|
| 2004/0161662 A1* | 8/2004 | Kim et al. ................ | 429/94 |
| 2004/0197643 A1 | 10/2004 | Buckle | |
| 2005/0277018 A1 | 12/2005 | Kim | |
| 2009/0246639 A1 | 10/2009 | Kim | |

FOREIGN PATENT DOCUMENTS

| | | |
|---|---|---|
| JP | 2000-188115 | 7/2000 |
| JP | 2003-331851 A | 11/2003 |
| KR | 1020050112421 A | 11/2005 |
| KR | 10-2007-0099068 A | 10/2007 |
| KR | 10-2008-0005627 A | 1/2008 |

OTHER PUBLICATIONS

English machine translation of Japanese Publication No. 2003-331851 dated Nov. 21, 2003 in the name of Kusakabe et al., 7 pages.
Korean Notice of Allowance dated Nov. 29, 2010 of the corresponding Korean Patent Application No. 10-2008-0058965, noting listed references in this IDS.

* cited by examiner

*Primary Examiner* — Ula C Ruddock
*Assistant Examiner* — Scott J Chmielecki
(74) *Attorney, Agent, or Firm* — Christie, Parker & Hale, LLP

(57) ABSTRACT

A secondary battery includes an electrode assembly, an open-topped can accommodating the electrode assembly, and a cap assembly sealing the can. The electrode assembly includes a positive electrode plate having a positive electrode coated portion and positive electrode non-coating portions, a negative electrode plate having a negative electrode coated portion and negative electrode non-coating portions, and a separator interposed between the positive and negative electrode plates and wound with the electrode plates. The positive electrode non-coating portion has a region where the height of the positive electrode non-coating potion is lower than that of the positive electrode coating portions.

15 Claims, 6 Drawing Sheets

ELECTRODE ASSEMBLY AND SECONDARY BATTERY HAVING THE SAME

CROSS-REFERENCE TO RELATED APPLICATION

This application claims priority to and the benefit of Korean Patent Application No. 10-2008-0058965 filed on Jun. 23, 2008 in the Korean Intellectual Property Office (KIPO), the entire content of which is incorporated herein by reference.

BACKGROUND OF THE INVENTION

1. Field of the Invention

The present invention relates to secondary batteries, and, more particularly, to electrode assembly short circuit prevention.

2. Description of the Related Art

In general, a secondary battery, which, unlike a primary battery which is unable to be recharged, is rechargeable and dischargeable, and is widely employed in high-end electronic apparatuses such as mobile communication terminals, laptop computers, camcorders, and the like.

Particularly, since a lithium secondary battery has a high operating voltage and high energy density per unit weight, the market share of the lithium-ion battery in the battery market is increasing.

The lithium secondary battery typically includes positive electrode active materials such as lithium oxide and negative electrode active materials such as carbon. The lithium secondary battery may have various shapes. For example, there are cylinder type lithium secondary batteries, prismatic type lithium secondary batteries, and pouch type lithium secondary batteries.

Each of the cylinder and prismatic type lithium secondary battery cell may include an electrode assembly accommodated in a can and a cap assembly sealing a top opening of the can. The pouch type lithium secondary battery may include an electrode assembly and an aluminum pouch accommodating the electrode assembly.

The electrode assembly is wound by interposing a separator between a positive electrode plate and a negative electrode plate. Each of the positive electrode plate and the negative electrode plate includes an electrode collector and a coated portion which is formed by coating active materials on surfaces of the electrode collector. Also, each of the positive and negative electrode plates includes a non-coating portion which is absent the active materials on the electrode collector. Electrode tabs are welded and fixed to the non-coating portions.

The separator is disposed between the positive electrode plate and the negative electrode plate to insulate therebetween. The separator may be made of polyethylene, polypropylene, or a composite film of polyethylene and polypropylene.

Heat is generated inside the secondary battery when there is overcharge generated during the charge of the secondary battery or when there is a short circuit between the electrodes. Since the negative electrode tab typically made of dissimilar metal with the negative electrode collector is welded to each other at the non-coating portion of the negative electrode plate, internal resistance (IR) is increased and heat is concentrated.

When heat is concentrated around the negative electrode tab, the separator positioned at the region where the negative electrode tab is positioned may be melted or contracted. The separator would typically be excessively contracted at the corners of the separator so that a short circuit may occur between corners of the negative and positive electrode plates.

Specifically, in the case of a short circuit between the positive electrode collector and the negative electrode coating portion, a fire and/or an explosion could occur in the secondary battery and safety of the secondary battery would be significantly deteriorated. Since energy density of the secondary battery is increasing as a capacity of the secondary battery increases, the likelihood of a short circuit between the electrode plates caused by heat at the electrode tabs due to an internal short circuit becomes greater.

SUMMARY OF THE INVENTION

In accordance with the present invention an electrode assembly is provided in which a short circuit between a positive electrode collector and a negative electrode coated portion occurring by contraction of a separator due to heat around electrode tabs during the overcharge or the internal short circuit of a secondary battery is prevented.

In accordance with an embodiment of the present invention, there is provided an electrode assembly including a positive electrode plate having a positive electrode collector. A positive electrode coated portion is coated on at least one surface of the positive electrode collector. Surfaces of the positive electrode collector include positive electrode non-coating portions where the positive electrode active material is absent. A negative electrode plate includes a negative electrode collector. A negative electrode coated portion is coated on at least one surface of the negative electrode collector. Surfaces of the negative electrode collector include negative electrode non-coating portions where the negative electrode active material is absent. A separator is interposed between the positive electrode plate and the negative electrode plate. The positive electrode plate and negative electrode plate and separator are wound in the form of a jelly-roll. The positive electrode non-coating portion includes a short circuit preventing region configured such that the height of the positive electrode non-coating portion is lower than that of the positive electrode coated portion.

The positive electrode plate further includes a positive electrode tab attached to the positive electrode non-coating portion. The negative electrode plate further includes a negative electrode tab attached to the negative electrode non-coating portion. The short circuit preventing region is formed at a position of the positive electrode non-coating portion corresponding to a region to which the negative electrode tab is attached.

The short circuit preventing region may be formed within 3 cm from both side ends of the negative electrode tab in both widthwise directions of the negative electrode plate at a position corresponding to a region to which the negative electrode tab is attached.

When the electrode assembly is wound, the negative electrode tab may be positioned in an inner circumference of the electrode assembly, and the short circuit preventing region may be formed at the positive electrode non-coating portion of the positive electrode plate positioned in the inner circumference of the electrode assembly. In this case, the positive electrode non-coating portion in which the short circuit preventing region is formed may be wound to face the negative electrode coated portion of the negative electrode plate and interposing the separator between the positive electrode non-coating portion and the negative electrode coated portion in the inner circumference of the electrode assembly.

When the electrode assembly is wound, the negative electrode tab may be positioned in an outer circumference of the electrode assembly, and the short circuit preventing region may be formed at the positive electrode non-coating portion of the positive electrode plate positioned in the outer circumference of the electrode assembly. In this case, the positive electrode non-coating portion in which the short circuit preventing region is formed may be wound to face the negative electrode coated portion of the negative electrode plate and interposing the separator between the positive electrode non-coating portion and the negative electrode coated portion in the outer circumference of the electrode assembly.

The short circuit preventing region may include a chamfer or a curved surface formed at one of a top and a bottom end of the positive electrode non-coating portion. The chamfer may have an angle of 30 degrees to 80 degree downwardly or upwardly from the lengthwise direction of the positive electrode plate.

The positive electrode plate may further include a lamination tape covering a end region of the positive electrode coated portion and the positive electrode non-coating portion proximate to the end region of the positive electrode coating portion. A height of the lamination tape may correspond to a height of the positive electrode non-coating portion. The lamination tape may have an end horizontally spaced apart from an end of the positive electrode non-coating portion and adhered to the positive electrode non-coating portion such that an exposed region is formed in the positive electrode non-coating portion. A distance where the end of the lamination tape is spaced apart from the end of the positive electrode non-coating portion may be equal to or less than 2 mm.

Moreover, in accordance with another embodiment of the present invention, there is provided a secondary battery having an open-topped can accommodating an electrode assembly. A cap assembly seals an opening of the can. The electrode assembly is made in the form of the electrode assembly including the short circuit preventing region. The secondary battery may be made in the form of one of a cylinder type secondary battery and a prismatic type secondary battery.

In accordance with another embodiment of the present invention, there is provided a secondary battery having an electrode assembly which includes a positive electrode tab and a negative electrode tab. A pouch accommodates the electrode assembly such that some of the positive electrode tab and the negative electrode tab are exposed. The electrode assembly is made in the form of the electrode assembly including the short circuit preventing region.

In accordance with the present invention, the chamfer may be formed at the positive electrode non-coating portion corresponding to the region to which the negative electrode tab is formed to reduce an area of the positive electrode non-coating portion exposed due to the contraction or melting of the separator. The short circuit between the positive electrode collector and the negative electrode active material becomes remarkably restricted so that stability of the secondary battery is improved.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
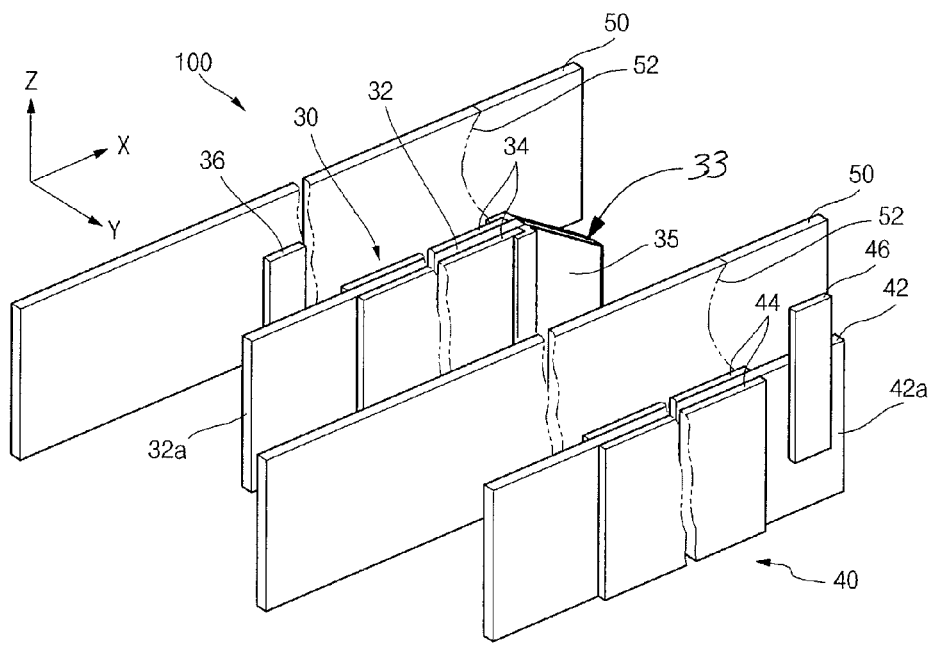
FIG. 1 is an exploded perspective view illustrating an electrode assembly according to an embodiment of the present invention.
Figure 2:
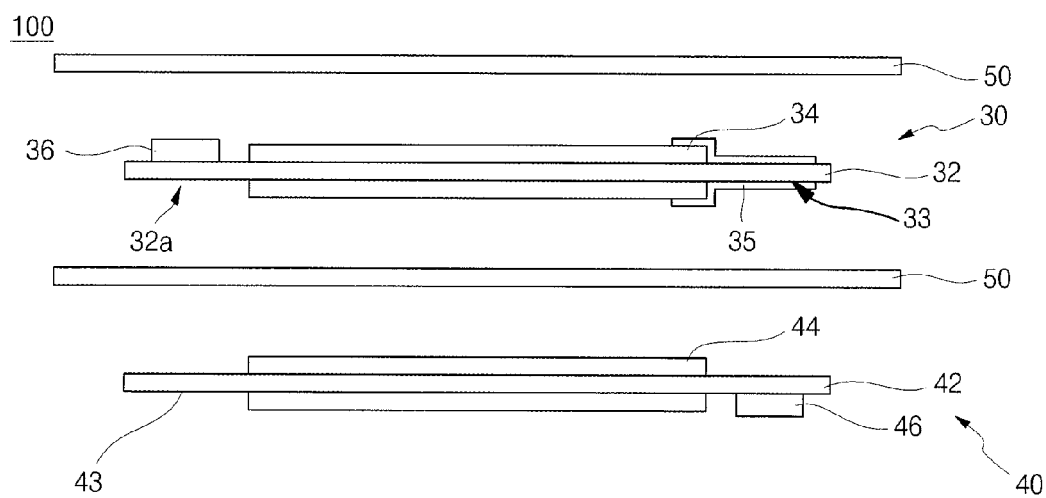
FIG. 2 is a plan view illustrating the electrode assembly in FIG. 1.

Referring to FIGS. 1 and 2, an electrode assembly 100 according to an embodiment of the present invention includes a positive electrode plate 30, a negative electrode plate 40, and a separator 50 interposed between the positive electrode plate 30 and the negative electrode plate 40 so as to prevent an electrical short circuit between the positive electrode plate 30 and the negative electrode plate 40. Also, the electrode assembly 100 is formed by winding the positive electrode plate 30, the negative electrode plate 40 and the separator 50 in the form of a jelly-roll. Hereinafter, the term "height" refers to the length extending in the direction of the Z axis in FIG. 1, a top end refers to the upper end of the positive electrode plate and the negative electrode plate in the direction of the Z axis, and a bottom end refers to the lower end of the positive electrode plate and the negative electrode plate in the direction of the Z axis. Also, a widthwise direction refers to the direction orthogonal to the height, that is, the direction of the X axis.

In the electrode assembly 100, the positive electrode plate 30 has a short circuit preventing region to prevent a short circuit between the positive electrode plate 30 and the negative electrode plate 40 even when corners of the separator 50 contract due to heat.

The positive electrode plate 30 includes a positive electrode collector 32 made of thin aluminum foil and a positive electrode coated portion 34 coated with a positive electrode active material including lithium oxide as a main component on both surfaces of the positive electrode collector 32. Also, the positive electrode plate 30 includes positive electrode non-coating portions 32a where the positive electrode active material is absent on the surfaces of the positive electrode collector 32. The positive electrode plate 30 may further include a lamination tape 35 covering some of an end region of the positive electrode coated portion 34 and the positive electrode non-coating portions 32a proximate to the end region of the positive electrode coated portion 34.

In the embodiment shown in FIGS. 1 and 2, the lamination tape 35 is depicted as attached to sides of the positive electrode plate 30 at one end only. However, the lamination tape 35 may be attached at both ends of the positive electrode plate 30 at regions including boundary regions between the positive electrode coated portions (i.e., positive electrode coated regions) 34 formed on the surface of the positive electrode plate 30 and the positive electrode non-coating portions (i.e., positive electrode non-coating regions) 32a. The lamination tape 35 may also be attached to overall boundary regions between negative electrode coated portions (i.e., negative electrode coated regions) 44 and negative electrode non-coating portions (i.e., negative electrode non-coating regions) 42a.

The positive electrode 30 includes a short circuit preventing region 33 where the height of the positive electrode non-coating portions 32a is lower than that of the positive electrode coating portions 34. That is, the short circuit preventing region 33 is formed such that a top end of the positive electrode non-coating portions 32a is lower than that of the positive electrode coated portions 34. In other words, the height of the positive electrode non-coating portions 32a (H_b in FIG. 3) in the short circuit prevention region is smaller than the height of the positive electrode coated portions (H_a in FIG. 3).

The short circuit preventing region 33 is formed at a position of the positive electrode non-coating portions 32a corresponding to a region of the negative electrode non-coating portions 42a where a negative electrode tab 46 is attached. The short circuit preventing region 33 is formed within 3 cm from both side ends of the negative electrode tab in both widthwise directions of the negative electrode plate, that is, the direction of X axis in FIG. 1, at the positions of the positive electrode non-coating portions 32a corresponding to the region on which the negative electrode tab 46 is attached to. When the short circuit preventing region 33 is positioned farther than 3 cm from the positions corresponding the region on which the negative electrode tab is attached, the prevention effect of a short circuit between the positive electrode non-coating portions 32a and the negative electrode plate 40, particularly the negative electrode coated portions 44 is significantly deteriorated during the melting of the separator 50. Since relatively more heat is generated from the region where the negative electrode tab 46 is attached than other regions, the region of the separator 52 around the negative electrode tab 46 becomes relatively more contracted than other regions of the separator 52. Thus, since an exposed area of the positive electrode coated portions 32a is remarkably reduced even when the separator 52 at the position corresponding to the negative electrode tab 46 is melted, a short circuit between the positive electrode plate 30 and the negative electrode plate 40 is prevented. Particularly, the short circuit preventing regions restrict a short circuit between the positive electrode non-coating portions 32a and the negative electrode coating portions 34.

The negative electrode plate 40 includes a negative electrode collector 42 of thin copper foil and the negative electrode coated portions 44 coated with a negative electrode active material including carbon as a main component on both surfaces of the negative electrode collector 42. The negative electrode collector 42 includes negative electrode non-coating portions 42a where the negative electrode active material is absent on the surfaces of the negative electrode collector 42 with a predetermined area. A negative electrode tab 46 is welded and fixed to the negative electrode non-coating portions 42a and an end of the negative electrode tab 46 is fixed to the negative electrode collector 42 to protrude over a top of the negative electrode collector 42. The negative electrode tab 46 is generally made of nickel, nickel alloy, or another metal.

The separator 50 is interposed between the positive electrode plate 30 and the negative electrode plate 40 to insulate between the positive electrode plate 30 and the negative electrode plate 40. The separator 50 may be made of polyethylene, polypropylene, or a composite film of polyethylene and polypropylene. In order to prevent a short circuit between the positive electrode plate 30 and the negative electrode plate 40 as illustrated in the drawings, the height of the separator 50 may be higher than that of the positive electrode plate 30 and the negative electrode plate 40.

In the electrode assembly 100, the negative electrode tab 46 is positioned at an inner circumference of the electrode assembly 100 and the short circuit preventing region 33 may be formed at the positive electrode non-coating portions 32a of the positive electrode plate 30 that is positioned at the inner circumference of the electrode assembly 100. In other words, the positive electrode non-coating portions 32a in which the short circuit preventing region 33 is formed may be wound to face the negative electrode coated portions 44 of the negative electrode plate 40 by interposing the separator 50 at the inner circumference of the electrode assembly 100. Here, the "inner circumference" of the electrode assembly refers to the central portion of the electrode assembly.

The electrode assembly 100 may be configured such that the negative electrode tab 46 is positioned at an outer circumference of the electrode assembly 100 and the short circuit preventing region 33 is formed at the positive electrode non-coating portions 32a of the positive electrode plate 30 positioned at the outer circumference of the electrode assembly 100. In other words, the positive electrode non-coating portions 32a in which the short circuit preventing region 33 is formed may be wound to face the negative electrode coating portions 44 of the negative electrode plate 40 by interposing the separator 50 at the outer circumference of the electrode assembly 100. Here, the "outer circumference" of the electrode assembly refers to the outside portion of the electrode assembly.

In this case, the inner circumference of the electrode assembly 100 means a central region of the jelly-roll when the positive electrode plate 30, the negative electrode plate 40, and the separator 50 are wound in the form of the jelly-roll. The outer circumference of the electrode assembly 100 means an outer region of the jelly-roll.

Hereinafter, the electrode assembly according to the embodiment of the present invention will be described in more detail.

Figure 3:
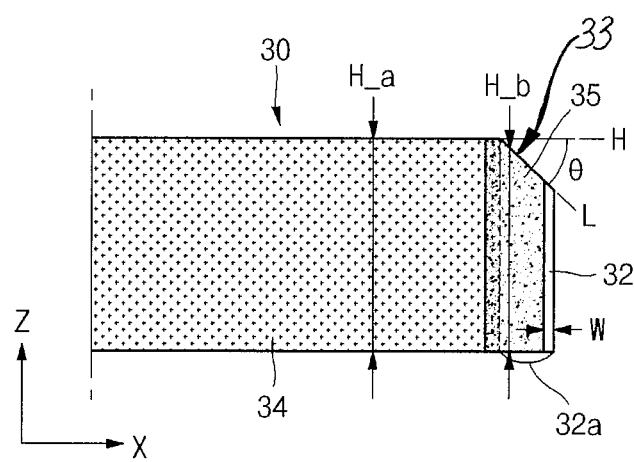
FIG. 3 is a partial front view illustrating a positive electrode plate provided to the electrode assembly according to an embodiment of the present invention.

FIG. 3 is a partial front view illustrating a positive electrode plate provided to the electrode assembly according to an embodiment of the present invention.

Referring to FIG. 3, the positive electrode plate 30 includes the short circuit preventing regions portion 33 in which the height of the positive electrode non-coating portions 32a are lower than that of the positive electrode coating portions 34. That is, the short circuit preventing region 33 is configured such that the height of the positive electrode non-coating portions 32a is lower as the positive electrode non-coating portions 32a are more distant from the positive electrode coated portions 34. Here, the term "height" refers to the distance (H_a, H_b in FIG. 3) between the top end and the bottom end of the positive electrode coating portion or the positive electrode non-coating portion.

The short circuit preventing region 33 includes a chamfer (L) formed at a top corner of the positive electrode non-coating portions 32a. The chamfer (L) is chamfered to form an angle($\theta$) of 30 degrees to 80 degrees downward from the lengthwise direction (H). In another exemplary embodiment, the chamfer (L) is formed at 40 degrees to 50 degrees. In still another exemplary embodiment, the chamfer (L) is formed at 45 degrees. In one embodiment, when the angle ($\theta$) of the chamber is less than 30 degrees, since the exposed area of the positive electrode non-coating portions 32a cannot be sufficiently reduced during the melting of the separator 50, a sufficient short circuit prevention effect cannot be achieved. Moreover, in one embodiment, when the angle (θ) of the chamber is greater than 80 degrees, the area of the positive electrode non-coating portions is too small and this may cause trouble in fixing the positive electrode plate 30 to a winding apparatus during the winding of the electrode assembly 100 in the form of a jell-roll. When the angle (θ) is greater than 80 degrees, there may be some problems associated with disposing of scrap during the process.

Further, the short circuit preventing region 33 may be formed in a curved shape other than the chamfer. For example, instead of the positive electrode non-coating portions 32a being formed with the beveled edge or being cut at a straight line to form a chamfer (i.e., a beveled edge), the positive electrode non-coating portions 32a may have a curved shape, a chamfer shape formed by a curve, or be cut at a curve to form a curved shape. The short circuit preventing region 33 may be formed at the bottom end of the positive electrode plate 30. In other embodiments, the negative electrode non-coating portions 42a may have a beveled edge or a curved shape.

The lamination tape 35 covers the end regions of the positive electrode coated portions 34 and the region of the positive electrode non-coating portions 32a which is adjacent to the end regions of the positive electrode coated portions 34. A height of the lamination tape 35 corresponds to a height of the positive electrode non-coating portions 32a. Here, the term "height" refers to the distance (H_a, H_b in FIG. 3) between the top end and the bottom end of the positive electrode coating portion or the positive electrode non-coating portion. The lamination tape 35 formed at the positive electrode non-coating portions 32a having the short circuit preventing region 33 is formed in a shape such that its height is less than the height of the positive electrode coated portions 34. The lamination tape 35 is adhered to the positive electrode non-coating portions 32a such that ends of the lamination tape 35 are spaced apart from an end region of the positive electrode non-coating portions 32a. A distance by which the ends of the lamination tape 35 are spaced apart from the ends of the positive electrode non-coating portions 32a is equal to or less than 2 mm. In other words, the distance between the ends of the lamination tape 35 and the ends of the positive electrode non coating portions 32a ("W" in FIG. 3) is equal to or less than 2 mm. When the distance is too long, the exposed area of the positive electrode non-coating portions 32a is relatively large and the short circuit preventing function of the lamination tape 35 is deteriorated. The distance is sufficiently greater than a thickness of a cutter (not shown) cutting the positive electrode non-coating portions 32a. Thus, a minimum of the distance is not limited here.

When the lamination tape 35 is formed over the entire positive electrode non-coating portions 32a, the lamination tape 35 must be cut off during the cutting of the positive electrode non-coating portions 32a. Since the lamination tape 35 is made of organic material, the lamination tape 35 is not clearly cut like the positive electrode non-coating portions 32a made of metal but deformation such as burrs is generated during the cutting. The deformation acts as contamination inside the secondary battery.

The lamination tape 35 may be made of polyolefin based material such as PP, PE, PS, and PET or engineering plastic. The thickness of the lamination tape 35 in another exemplary embodiment is 5 micrometers to 50 micrometers.

Figure 4:
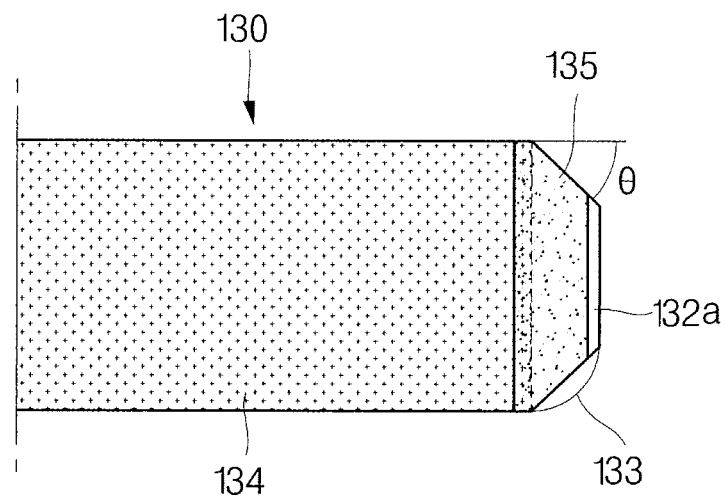
FIG. 4 is a partial front view illustrating a positive electrode plate provided to an electrode assembly according to another embodiment of the present invention.

Referring now to FIG. 4, an electrode assembly according to another embodiment of the present invention will be described.

FIG. 4 is a partial front view illustrating a positive electrode plate provided to an electrode assembly according to another embodiment of the present invention. The electrode assembly according to such embodiment has chamfers different from those of the positive electrode plate in the above-mentioned embodiment of the present invention. A description of the same components as those illustrated in FIGS. 1 to 3 will be omitted.

A positive electrode plate 130 of the electrode assembly according to the embodiment shown in FIG. 4 includes short circuit preventing regions 133 formed at the bottom end of positive electrode non-coating portions 132a identical to that formed at a top of the positive electrode non-coating portions 132a. The positive electrode plate 130 may further include a lamination tape 135 covering some of an end region of the positive electrode coated portion 134 and the positive electrode non-coating portions 132a proximate to the end region of the positive electrode coated portion 134.

The short circuit preventing regions 133 are formed on the top and bottom end of the positive electrode non-coating portions 132a in the form of a chamfer. An angle (θ) of the chamfers is 30 degrees to 80 degrees downwardly and upwardly from the lengthwise direction.

Since in the positive electrode plate 130 the chamfers are formed on the top and the bottom end of the positive electrode non-coating portions 132a, the area of the positive electrode non-coating portions 132a exposed during the melting of the separator is smaller. Thus, the positive electrode plate 130 can further prevent a short circuit between the positive electrode non-coating portions 132a and the negative electrode coating portions 44.

Next, a secondary battery employing the electrode assembly according to the embodiments of the present invention will be described.

Figure 5:
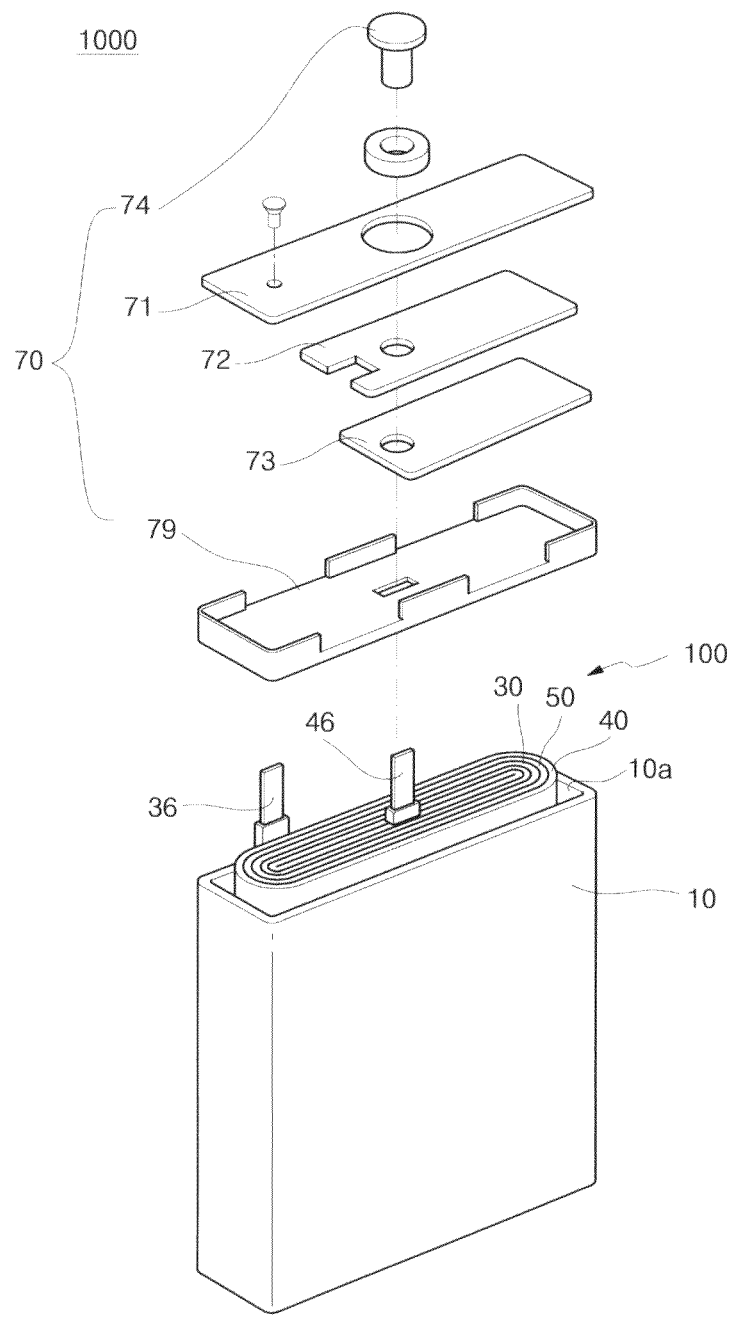
FIG. 5 is an exploded perspective view illustrating a prismatic type secondary battery.
Figure 6:
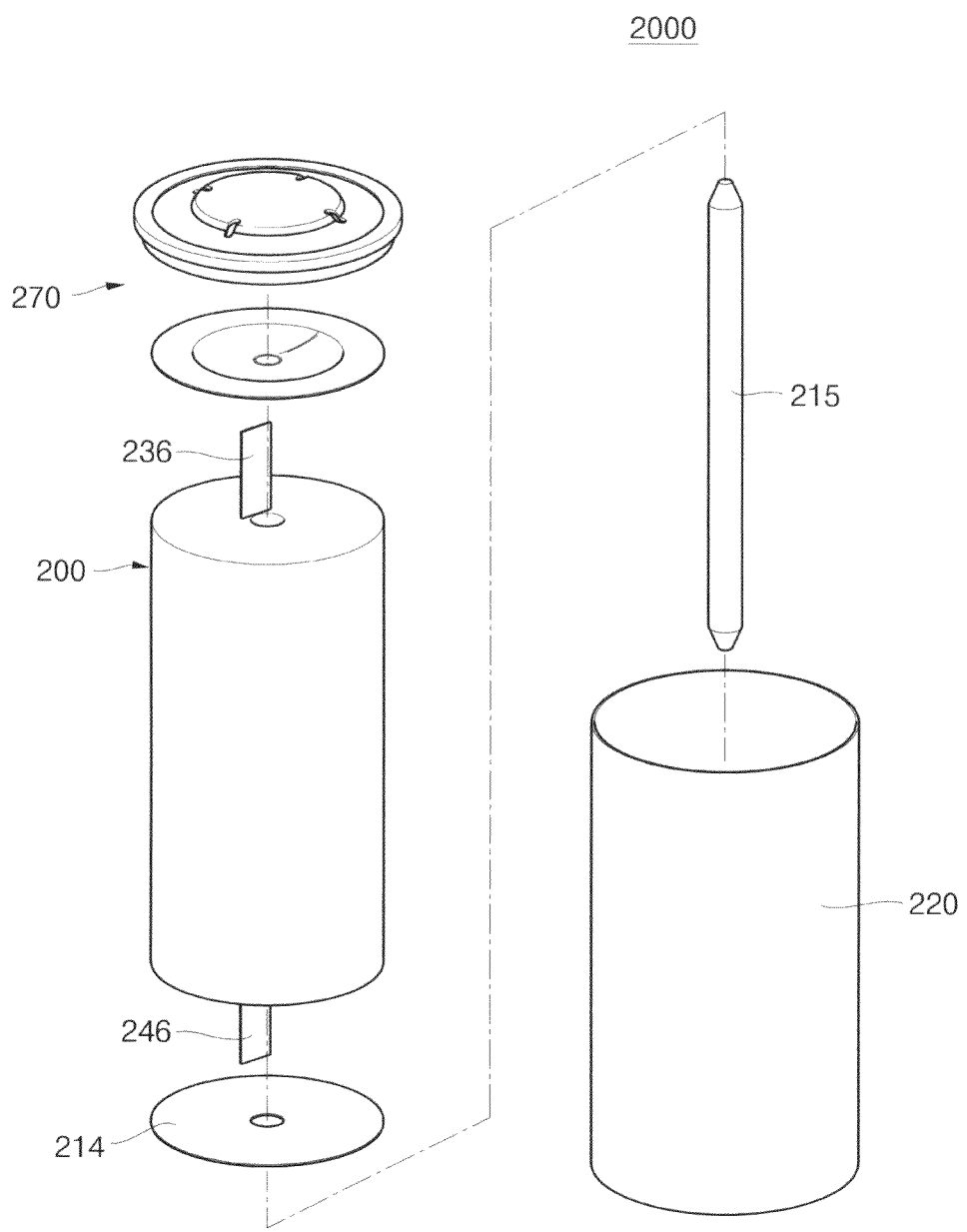
FIG. 6 is an exploded perspective view illustrating a cylinder type secondary battery.
Figure 7:
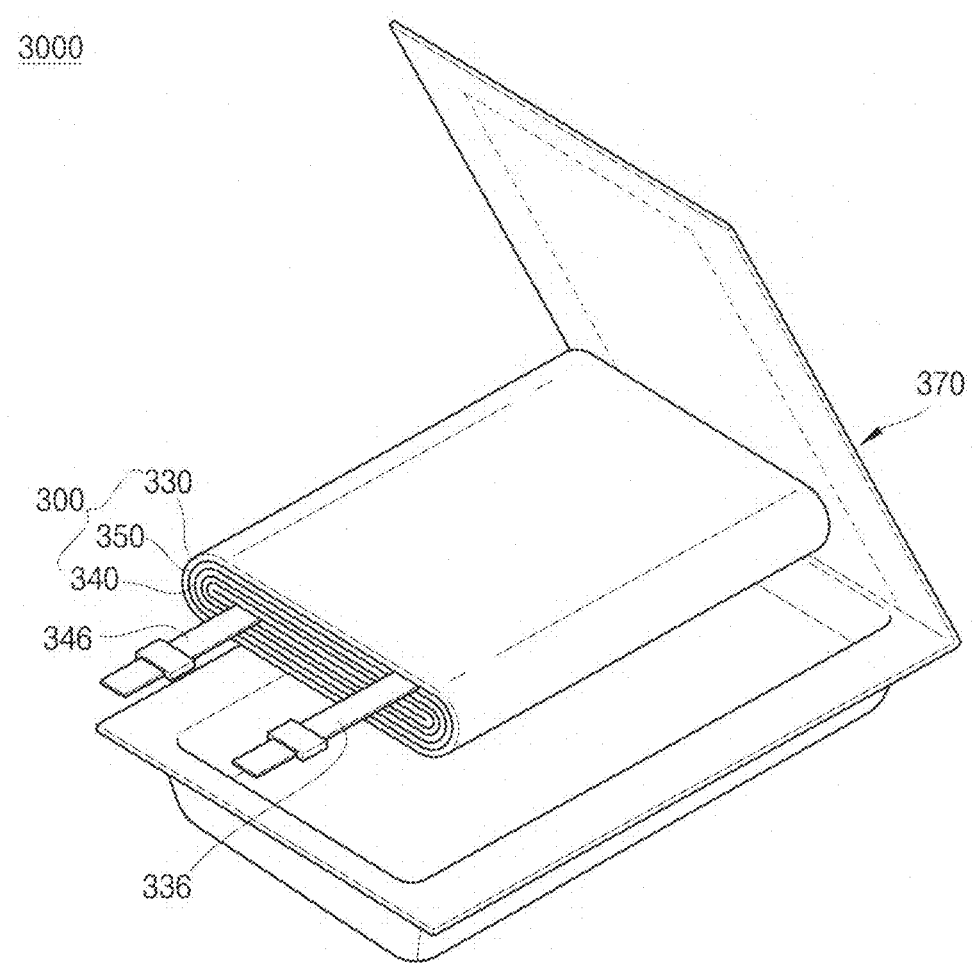
FIG. 7 is an exploded perspective view illustrating a pouch type secondary battery.

FIG. 5 is an exploded perspective view illustrating a prismatic type secondary battery. FIG. 6 is an exploded perspective view illustrating a cylinder type secondary battery. FIG. 7 is an exploded perspective view illustrating a pouch type secondary battery.

Referring to FIG. 5, the prismatic type secondary battery 1000 according to an embodiment of the present invention includes an electrode assembly 100 according to the above-mentioned electrode assembly embodiments of the present invention, an open-topped can 10 accommodating the electrode assembly 60, and a cap assembly 70 sealing an opening of the can 10. The cap assembly 70 includes a cap plate 71, an insulator plate 72, a terminal plate 23, and a first electrode terminal 74. The cap assembly 70 is coupled with an insulator case 70 and coupled with a top opening 10a of the can 10 to seal the can 10.

The electrode assembly 100 includes a positive electrode plate 30, a negative electrode plate 40, and a separator 50. The electrode assembly 60 further includes a positive electrode tab 36 and a negative electrode tab 46. The positive electrode plate 30, the negative electrode plate 40, and the separator 50 are identical to the positive electrode plate 30, the negative electrode plate 40, and the separator 50 of the electrode assembly 100 according to the above-mentioned electrode assembly embodiments of the present invention.

Since the prismatic type secondary battery 1000 is a typical prismatic type secondary battery except for the electrode assembly 100, its detailed description will be omitted. The electrode assembly 100 according to the embodiments of the present invention may be applied to various square type secondary batteries other than the secondary battery as illustrated in FIG. 5.

Referring to FIG. 6, a cylinder type secondary battery 2000 according to an embodiment of the present invention includes an electrode assembly 200 according to the above-mentioned electrode assembly embodiments of the present invention, an open-topped can 220 accommodating the electrode assembly 200, and a cap assembly 270 sealing an opening of the can 220.

The electrode assembly 200 includes a positive electrode plate, a negative electrode plate, and a separator. The electrode assembly 200 further includes a positive electrode tab 236 and a negative electrode tab 246. The positive electrode tab 236 protrudes over the top of the electrode assembly 200, and the negative electrode tab 246 protrudes over the bottom end of the electrode assembly 200.

The positive electrode plate, the negative electrode plate, and the separator of the electrode assembly 200 are identical to the positive electrode plate 30 and 130, the negative electrode plate 40, and the separator 50 of the electrode assembly according to the above-mentioned electrode assembly embodiments of the present invention.

In this case, a positive electrode plate having a chamfered bottom end like a top end of the positive electrode non-coating portions is used to effectively prevent a short circuit caused by the melting of the separator corresponding to the bottom end of the positive electrode plate. A reference numeral 214 indicates a lower insulator plate and a reference numeral 215 indicates a center pin.

Since the cylinder type secondary battery 2000 is a typical cylinder type secondary battery except for the electrode assembly 200, its detailed description will be omitted. The electrode assembly according to the embodiments of the present invention may be various cylinder type secondary batteries other than the secondary battery as illustrated in FIG. 6.

Referring to FIG. 7, a pouch type secondary battery 3000 according to an embodiment of the present invention includes an electrode assembly 300 according to above-mentioned electrode assembly embodiments of the present invention and a pouch 370 accommodating the electrode assembly 300.

The electrode assembly 300 includes a positive electrode plate 330, a negative electrode plate 340, and a separator 350. The electrode assembly 300 further includes a positive electrode tab 336 and a negative electrode tab 346. The positive electrode plate 330, the negative electrode plate 340, and the separator 350 are identical to the positive electrode plate 30 and 130, the negative electrode plate 40, and the separator 50 of the electrode assembly according to the above-mentioned electrode assembly embodiments of the present invention.

Since the pouch type secondary battery 3000 is a typical pouch type secondary battery except for the electrode assembly 300, its detailed description will be omitted. The electrode assembly according to the embodiments of the present invention may be applied to various pouch type secondary batteries other than the secondary battery as illustrated in FIG. 7.

Next, the secondary battery according to a further detailed Embodiment of the present invention will be described but is not limited to the following Embodiment.

Embodiment 94 g of lithium cobalt oxide ($LiCoO_2$), 3 g of carbon black, and 3 g of polyvinylidene difluoride (PVDF) are dissolved and dispersed in 80 g of N-methylpyrrolidone to produce positive electrode active material slurry. The positive electrode active material slurry is coated on aluminum foil as a collector, is dried using a coating apparatus and is pressed by a roll press to produce a positive electrode plate. Chamfers are formed on the top and the bottom end of the positive electrode non-coating portions at 45 degrees so that the positive electrode plate is finished.

90 g of mesocarbon microbead (MCMB manufactured by Osaka Gas Co., Ltd.), 10 g of polyvinylidene difluoride are dissolved and dispersed in 80 g of N-methylpyrrolidone to produce negative electrode active material slurry. The negative electrode active material slurry is coated on copper foil as a collector, is dried using the coating apparatus and is pressed by the roll press to produce a negative electrode plate.

Electrolyte (a solution with a concentration of 1.15M produced by dissolving $LiPF6$ as lithium salt in a solvent with a ratio of ethylene carbonate:propylene carbonate:dimethyl carbonate of 3:4:1) to be poured into a battery is prepared.

The electrode assembly is made by interposing the separator between the positive electrode plate and the negative electrode plate and winding the same such that the chamfered regions of the positive electrode plate correspond to the regions to which the negative electrode tab is attached. The electrode assembly is housed in a prismatic type can, the prepared electrolyte is poured into the prismatic type can, and an electrolyte pouring opening is sealed to finish a lithium ion battery.

Comparative Example

A Comparative Example is identical to the secondary battery cell according to the embodiments of the present invention except for the chamfers formed at the positive electrode non-coating portions of the positive electrode plate.

Safety Test of Secondary Battery at High-Temperature

Hereinafter, high-temperature short circuit tests performed on the battery according to the above-mentioned Embodiment of the present invention and the secondary battery of the Comparative Example will be described.

Figure 8A:
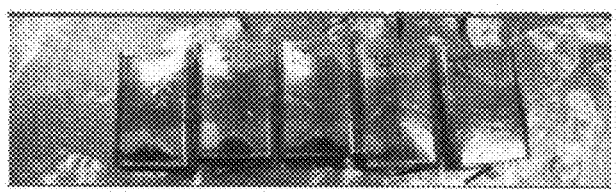
FIGS. 8A and 8B are photographs showing a wound and an unwound electrode assembly of the secondary battery according to the embodiments of the present invention after a short circuit test at high temperature.
Figure 8B:
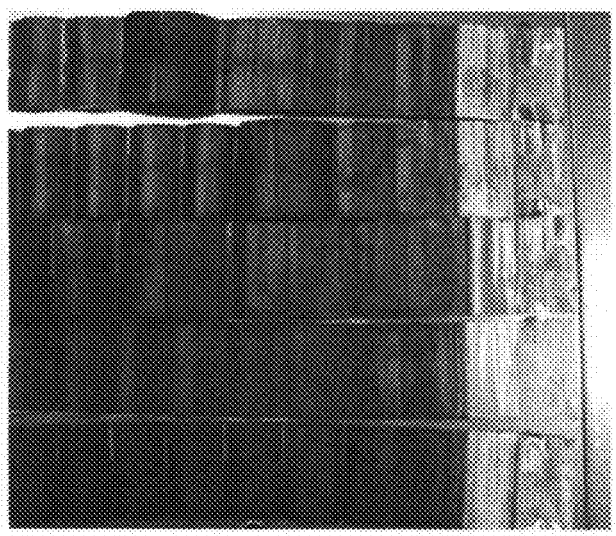
Figure 9A:
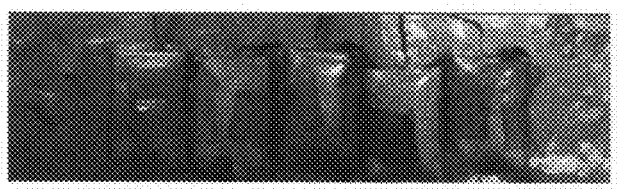
FIGS. 9A and 9B are photographs showing a wound and an unwound electrode assembly of the secondary battery of a Comparative Example after a short circuit test at high temperature.
Figure 9B:
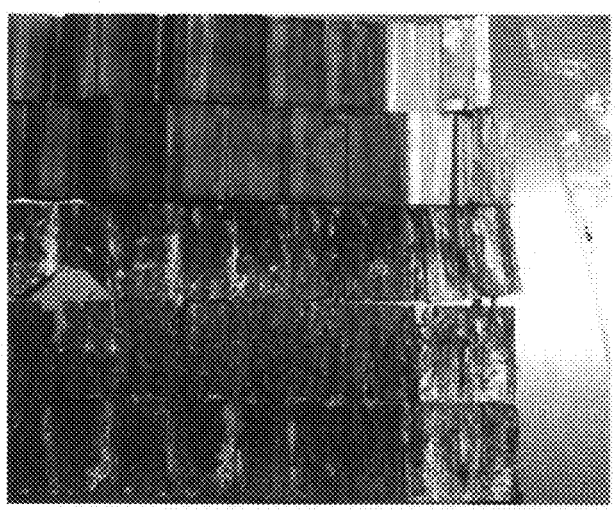

FIGS. 8A and 8B are photographs showing a wound and an unwound electrode assembly of the secondary battery according to the Embodiment of the present invention after the high temperature short circuit test, and FIGS. 9A and 9B are photographs showing a wound and an unwound electrode assembly of the secondary battery of the Comparative Example after the high temperature short circuit test.

Each of 5 sets of the lithium secondary batteries according to the Embodiment of the present invention and the Comparative Example are prepared and are fully charged. The fully charged lithium batteries are placed in an oven and the temperature of the lithium batteries is increased at a rate of 5 degrees Celsius per minute. After reaching 60 degrees Celsius, a short circuit between the positive electrode and the negative electrode is performed and whether the lithium secondary batteries catch on fire or explode is checked. The 60 degrees Celsius high-temperature short circuit test is performed to estimate whether the secondary batteries catch fire or explode by purposely making a short circuit between the positive electrode and the negative electrode while maintaining the secondary batteries at 60 degrees Celsius.

Comparing the test in FIG. 8A with the test in FIG. 9A, although a little of swelling and leakage is found in four secondary batteries according to the Embodiment of the present invention when viewing with a naked eye, no abnormality is found (one secondary battery) and explosion and fire do not occur. However, two secondary batteries of the Comparative Example leaked and three secondary batteries of the Comparative Example smoked while sparking and finally caught fire.

Moreover, comparing the test in FIG. 8B with the test in FIG. 9B, when the electrode assemblies according to the Embodiment of the present invention and the Comparative Example were dissembled and inspected, the electrode assembly according to the Embodiment of the present invention maintained their original state but traces of fire caused by heating from a short circuit between the negative electrode tab and the positive electrode non-coating portions can be found in the electrode assemblies of the secondary battery according to the Comparative Example.

Acceptable results were obtained in all five secondary batteries of the present invention from the high-temperature short circuit test at 60 degrees Celsius, and 90% more lifespan has been exhibited. Therefore, from the result, it can be understood that the secondary battery of the present invention can prevent a short circuit between the positive electrode non-coating portions and the negative electrode coating portions at high temperature and deterioration of the secondary battery.

What is claimed is:

1. An electrode assembly comprising:
   a positive electrode plate having:
      a positive electrode collector,
      a positive electrode coated portion comprising a positive electrode active material coated on at least one surface of the positive electrode collector, and
      a positive electrode non-coating portion where the positive electrode active material is absent on surfaces of the positive electrode collector;
   a negative electrode plate having:
      a negative electrode collector,
      a negative electrode coated portion comprising a negative electrode active material coated on at least one surface of the negative electrode collector, and
      a negative electrode non-coating portion where the negative electrode active material is absent on surfaces of the negative electrode collector; and
   a separator between the positive electrode plate and the negative electrode plate;
   wherein the positive electrode plate and negative electrode plate and separator are wound in a jelly-roll configuration,
   wherein the positive electrode non-coating portion includes a short circuit preventing region such that a height of the positive electrode non-coating portion is lower than a height of the positive electrode coated portion, and
   wherein the negative electrode plate further comprises a negative electrode tab attached to the negative electrode non-coating portion, the separator having a portion located between the negative electrode tab and the short circuit preventing region.

2. The electrode assembly of claim 1,
   wherein the positive electrode plate further comprises a positive electrode tab attached to the positive electrode non-coating portion; and
   wherein the short circuit preventing region is formed at a position of the positive electrode non-coating portion corresponding to a region to which the negative electrode tab is attached.

3. The electrode assembly of claim 2, wherein the short circuit preventing region is formed within 3 cm from the negative electrode tab in both widthwise directions of the negative electrode plate at a position corresponding to a region to which the negative electrode tab is attached.

4. The electrode assembly of claim 2, wherein, when the electrode assembly is wound, the negative electrode tab is positioned in an inner circumference of the electrode assembly, and the short circuit preventing region is formed at the positive electrode non-coating portion of the positive electrode plate positioned in the inner circumference of the electrode assembly.

5. The electrode assembly of claim 4, wherein the positive electrode non-coating portion where the short circuit preventing region is formed is wound facing the negative electrode coated portion of the negative electrode plate and interposing the separator between the positive electrode non-coating portion and the negative electrode coated portion in the inner circumference of the electrode assembly.

6. The electrode assembly of claim 2, wherein, when the electrode assembly is wound, the negative electrode tab is positioned in an outer circumference of the electrode assembly, and the short circuit preventing region is formed at the positive electrode non-coating portion of the positive electrode plate positioned in the outer circumference of the electrode assembly.

7. The electrode assembly of claim 6, wherein the positive electrode non-coating portion in which the short circuit preventing region is formed is wound to face the negative electrode coated portion of the negative electrode plate and interposing the separator between the positive electrode non-coating portion and the negative electrode coated portion in the outer circumference of the electrode assembly.

8. The electrode assembly of claim 1, wherein the short circuit preventing region comprises a chamfer shape formed by a bevel, or a chamfer shape formed by a curve, formed at at least one of top and bottom ends of the positive electrode non-coating portion.

9. The electrode assembly of claim 1, wherein the positive electrode plate further comprises a lamination tape covering an end region of the positive electrode coated portion and the positive electrode non-coating portion proximate to the end region of the positive electrode coating portion, and a height of the lamination tape corresponds to that of the positive electrode non-coating portion.

10. The electrode assembly of claim 9, wherein the lamination tape has an end horizontally spaced apart from an end of the positive electrode non-coating portion and adhered to the positive electrode non-coating portion such that an exposed region is formed in the positive electrode non-coating portion.

11. The electrode assembly of claim 10, wherein the end of the lamination tape is spaced apart from the end of the positive electrode non-coating portion by a distance equal to or less than 2 mm.

12. A secondary battery comprising:
   an electrode assembly;
   an open-topped can accommodating the electrode assembly; and
   a cap assembly sealing an opening of the can;
   wherein the electrode assembly comprises:
      a positive electrode plate having:
         a positive electrode collector,
         a positive electrode coated portion comprising a positive electrode active material coated on at least one surface of the positive electrode collector, and
         a positive electrode non-coating portion where the positive electrode active material is absent on surfaces of the positive electrode collector;
      a negative electrode plate having:
         a negative electrode collector,
         a negative electrode coated portion comprising a negative electrode active material coated on at least one surface of the negative electrode collector, and a negative electrode non-coating portion where the negative electrode active material is absent on surfaces of the negative electrode collector; and a separator between the positive electrode plate and the negative electrode plate;

wherein the positive electrode plate and negative electrode plate and separator are wound in a jelly-roll configuration, wherein the positive electrode non-coating portion includes a short circuit preventing region such that a height of the positive electrode non-coating portion is lower than a height of the positive electrode coated portion, and wherein the negative electrode plate further comprises a negative electrode tab attached to the negative electrode non-coating portion, the separator having a portion located between the negative electrode tab and the short circuit preventing region.

13. The secondary battery of claim 12, wherein the secondary battery is made in the form of one of a cylinder type secondary battery and a prismatic type secondary battery.

14. A secondary battery comprising:

an electrode assembly including a positive electrode tab and a negative electrode tab; and a pouch accommodating the electrode assembly such that some of the positive electrode tab and the negative electrode tab are exposed;

wherein the electrode assembly comprises:
  a positive electrode plate having:
    a positive electrode collector,
    a positive electrode coated portion comprising a positive electrode active material coated on at least one surface of the positive electrode collector, and
    a positive electrode non-coating portion where the positive electrode active material is absent on surfaces of the positive electrode collector;
  a negative electrode plate having:
    a negative electrode collector,
    a negative electrode coated portion comprising a negative electrode active material coated on at least one surface of the negative electrode collector, and
    a negative electrode non-coating portion where the negative electrode active material is absent on surfaces of the negative electrode collector; and
  a separator between the positive electrode plate and the negative electrode plate;
  wherein the positive electrode plate and negative electrode plate and separator are wound in a jelly-roll configuration, and
  wherein the positive electrode non-coating portion includes a short circuit preventing region such that a height of the positive electrode non-coating portion is lower than a height of the positive electrode coated portion
  wherein the separator has a portion located between the negative electrode tab and the short circuit preventing region.

15. The electrode assembly of claim 8, wherein the chamfer has an angle of 30 degrees to 80 degree downwardly or upwardly from a lengthwise direction of the positive electrode plate.

* * * * *